United States Patent [19]

Im

[11] Patent Number: 5,016,739
[45] Date of Patent: May 21, 1991

[54] FRICTION CLUTCH SYSTEM

[76] Inventor: Kwan-Soon Im, 132 O'Connor Drive, Toronto, Ontario, Canada, M4J 2S4

[21] Appl. No.: 360,057

[22] Filed: Jun. 1, 1989

[51] Int. Cl.⁵ .................... B60K 41/28; F16D 25/02
[52] U.S. Cl. ................... 192/0.08; 192/0.092; 192/3.58; 192/85 AA; 192/103 F
[58] Field of Search ............... 192/0.033, 0.052, 0.076, 192/0.08, 0.092, 0.096, 3.55, 3.57, 3.58, 85 A, 85 AA, 103 F, 104 F

[56] References Cited

U.S. PATENT DOCUMENTS

| | | | |
|---|---|---|---|
| 1,226,392 | 5/1917 | Simpson | 192/3.62 X |
| 1,544,897 | 7/1925 | Freeman | 192/3.62 |
| 3,322,248 | 5/1967 | Kaptur et al. | 192/3.58 |
| 3,752,280 | 8/1973 | Cheek | 192/85 AA |
| 3,894,446 | 7/1975 | Snoy et al. | 192/103 F X |
| 3,938,631 | 2/1976 | Smith | 192/103 F X |
| 4,012,968 | 3/1977 | Kelbel | 192/85 AA X |
| 4,401,199 | 8/1983 | Takano et al. | 192/0.052 |
| 4,445,400 | 5/1984 | Sullivan et al. | 192/85 AA X |
| 4,506,770 | 3/1985 | Schmid | 192/0.08 |
| 4,506,771 | 3/1985 | Krogh et al. | 192/12 R |
| 4,633,987 | 1/1987 | Rogner et al. | 192/0.092 |
| 4,719,998 | 1/1988 | Hiramatsu et al. | 192/0.033 |
| 4,821,604 | 4/1989 | Asano | 192/103 F X |

FOREIGN PATENT DOCUMENTS

| | | | |
|---|---|---|---|
| 207261 | 1/1960 | Austria | 192/0.092 |
| 228697 | 7/1987 | European Pat. Off. | 192/103 F |
| B29541 | 1/1956 | Fed. Rep. of Germany | 192/0.092 |

Primary Examiner—Richard Lorence
Attorney, Agent, or Firm—Riches, McKenzie & Herbert

[57] ABSTRACT

A friction clutch system is disclosed to couple a drive shaft and a driven shaft together by hydraulically urging clutch surfaces together. A pump for pressurizing the hydraulic system is mechanically coupled between the drive and driven shafts to rotate at speeds increasing with the difference in their respective speeds.

12 Claims, 6 Drawing Sheets

FRICTION CLUTCH SYSTEM

SCOPE OF THE INVENTION

This invention relates to friction clutches and, more particularly, to a hydraulically activated friction clutch system for automobiles.

BACKGROUND OF THE INVENTION

Friction clutches are well known. Such clutches are typically spring-biased to an engaged position. This is a disadvantage in that the friction clutches are spring-biased under initial constant bias pressure which cannot be adjusted to varying conditions.

Such conventional clutches have the disadvantage that on movement from a disengaged position to an engaged position, they rely on the skill of the operator to smoothly re-engage the clutch.

Clutch disengagement devices are known whereby as a precondition of moving a shift lever, the disengagement device automatically disengages the friction clutch. Such known devices, however suffer the disadvantage that conditions for re-engagement are preset and do not vary to accommodate different drive and driven shaft conditions. Jerky shifting, engine stalling and excessive clutch wear can result producing possible hazardous situations when used in passenger vehicles.

SUMMARY OF THE INVENTION

Accordingly, to at least partially overcome these disadvantages of previously known clutches, the present invention provides a friction clutch system in which clutch engagement and disengagement is hydraulically controlled sensitive to speed differential between drive and driven shafts.

One object of the present invention is to provide a friction clutch assembly which can be disengaged and engaged by an on-off type switch yet permits smooth re-engagement of the clutch under a variety of conditions.

Another object is to provide a manual transmission system wherein a manual clutch pedal is not required, and movement of the shift lever activates engagement and disengagement of the clutch.

Another object is to provide a hydraulically operated friction clutch system in which hydraulic oil activating re-engagement is pumped as a function of the speed differential between drive and driven shafts.

Another object is to provide a hydraulically operated friction clutch system which permits smooth reengagement of the clutch.

Another object is to provide a hydraulically controlled friction clutch system in which clutch pressure is adjusted to varying conditions dependent upon relative rotation between drive and driven shafts.

Accordingly, in one of its aspects the present invention provides a friction clutch system to releasably couple drive shaft means to driven shaft means comprising:

clutch disc means rotatable about an axis, the clutch disc means coupled to the drive shaft means for rotation therewith, clutch plate means journalled for rotation about said axis adjacent the clutch disc means, the clutch plate means coupled to the driven shaft means for rotation therewith, the clutch plate means and clutch disc means axially displaceable into frictional engagement to rotate the driven shaft means at the speed of the drive shaft means, spring means biasing the clutch disc means and clutch plate means apart out of frictional engagement, hydraulic circuit means comprising oil resevoir means; pump means; clutch cylinder means; and oil valve means, connected by oil line means in sequence with the pump means to circulate oil in one direction only from the reservoir means through the pump means to the clutch cylinder means, then through the oil valve means and back to the reservoir means, the oil valve means movable between an open position to permit oil flow therethrough and a closed position to prevent oil flow therethrough, the clutch cylinder means operable when pressurized by oil from said pump means when said oil valve means is closed to overcome the bias of the spring means and urge said clutch disc and said clutch plate means together into frictional engagement, the pump means comprising rotatable positive displacement impeller means to pump the oil with the pump means circulating the oil in said one direction when the impeller means is rotated in either direction, one way means preventing flow of oil through said pump means in a direction opposite said one direction, the impeller means mechanically coupled between the drive shaft means and the driven shaft means to rotate at speeds proportional to the difference in rotational speeds of the drive shaft means and the driven shaft means.

In another aspect, the present invention provides a friction clutch system to releasably couple drive shaft means to driven shaft means comprising:

first clutch means rotatable about an axis, the clutch disc means coupled to the drive shaft means for rotation therewith, second clutch means journalled for rotation about said axis adjacent the first clutch means, the second clutch means coupled to the driven shaft means for rotation therewith, one of the first clutch means and second clutch means displaceable into frictional engagement with the other to rotate the driven shaft means and the drive shaft means together, means biasing the first clutch means and second clutch means apart out of frictional engagement, hydraulic circuit means comprising pump means; clutch cylinder means; and oil valve means, connected by oil line means in sequence with the pump means to circulate oil from the pump means to the clutch cylinder means, and then back to the pump means, the oil valve means movable between an open position to permit oil flow therethrough and a closed position to prevent oil flow therethrough, the clutch cylinder means operable when pressurized by oil from said pump means when said oil valve means is closed to overcome the bias of the spring means and urge said first clutch means and said second clutch means together into frictional engagement, one way means preventing reverse flow of oil through said pump means from said clutch cylinder means, the pump means mechanically coupled between the drive shaft means and the driven shaft means to pump oil at flow rates which increase with an increase in the difference in rotational speeds of the drive shaft means and the driven shaft means.

A friction clutch system is disclosed to couple a drive shaft and a driven shaft together by hydraulically urging clutch surfaces together A pump for pressurizing the hydraulic system is mechanically coupled between the drive and driven shafts to rotate at speeds increasing with the difference in their respective speeds. Optionally, the drive and driven shafts can be hydraulically coupled via the hydraulic system to transmit some rotational forces between the drive and driven shafts when the clutch is not engaged.

BRIEF DESCRIPTION OF THE DRAWINGS

Further aspects and advantages of the present invention will become apparent from the following description taken together with the accompanying drawings in which.

DETAILED DESCRIPTION OF THE DRAWINGS

Figure 1:
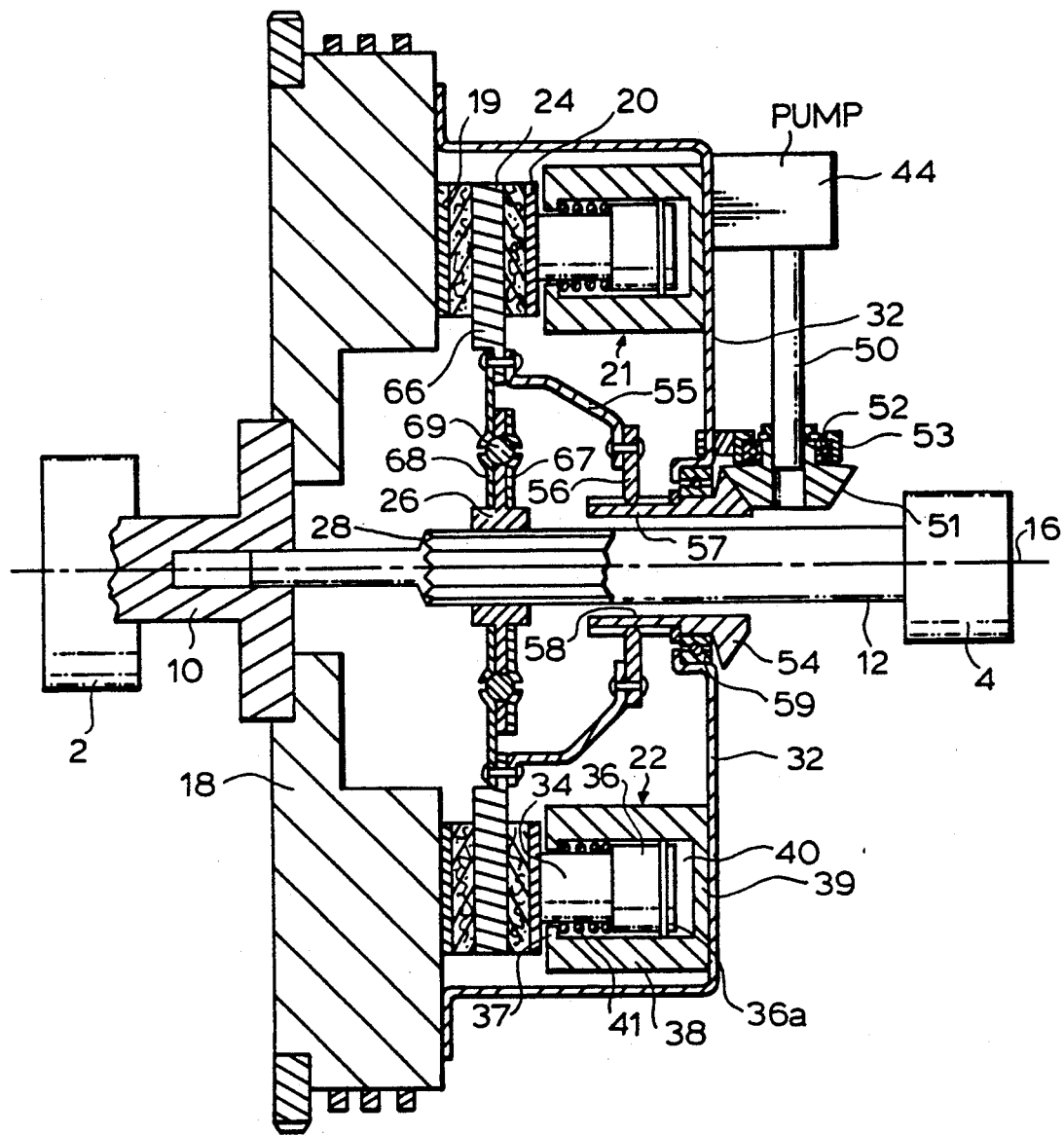
FIG. 1 is a simplified, schematic cross-sectional view of a clutch assembly in accordance with a first embodiment of the invention.

Reference is made first to FIG. 1 showing a friction clutch assembly for use in an automobile to releasably couple a drive shaft 10 to a driven shaft 12. Drive shaft 10 is the output shaft of a motor 2 of an automobile. Driven shaft 12 is connected to the transmission 4 of the automobile. Both drive shaft 10 and driven shaft 12 are journalled for rotation about the same axis 16.

Flywheel 18 is fixed to drive shaft 10. Flywheel 18 carries a pair of annular clutch discs 19 and 20. Clutch disc 19 is fixed to flywheel 18. Clutch disc 20 is fixed to flywheel 18 for rotation therewith but is movable axially by clutch cylinders shown as 21 and 22.

Clutch plate 24 is located axially between the two clutch discs 19 and 20 so that axial movement of clutch disc 20 towards clutch disc 19 will sandwich clutch plate 24 therebetween in frictional engagement to engage the clutch. Similarly, axial movement of clutch disc 20 away from clutch disc 19 will result in disengagement of the clutch plate 24.

An inner ring 26 of clutch plate 24 carries splines complimentary to splines 28 on driven shaft 12 so that the clutch plate 24 and driven shaft 12 are rotatably coupled yet the clutch plate 24 may slide axially relative to driven shaft 12 as is required during clutch engagement and disengagement.

The two clutch cylinders 21 and 22 are shown at diametrically opposed locations secured by fixed bracket 32 to flywheel 18. Each cylinder 21 and 22 has an axially movable piston 34 whose head 36 and the seal ring 36a defines, with side wall 38 and end walls 39 of the cylinder, a sealed hydraulic chamber 40. A compression spring 41 acts between head 36 and end wall 37 to bias piston 34 to a disengaged position. Piston 34 is secured to clutch disc 20 so that clutch disc 20 moves with movement of piston 34.

Figure 2:
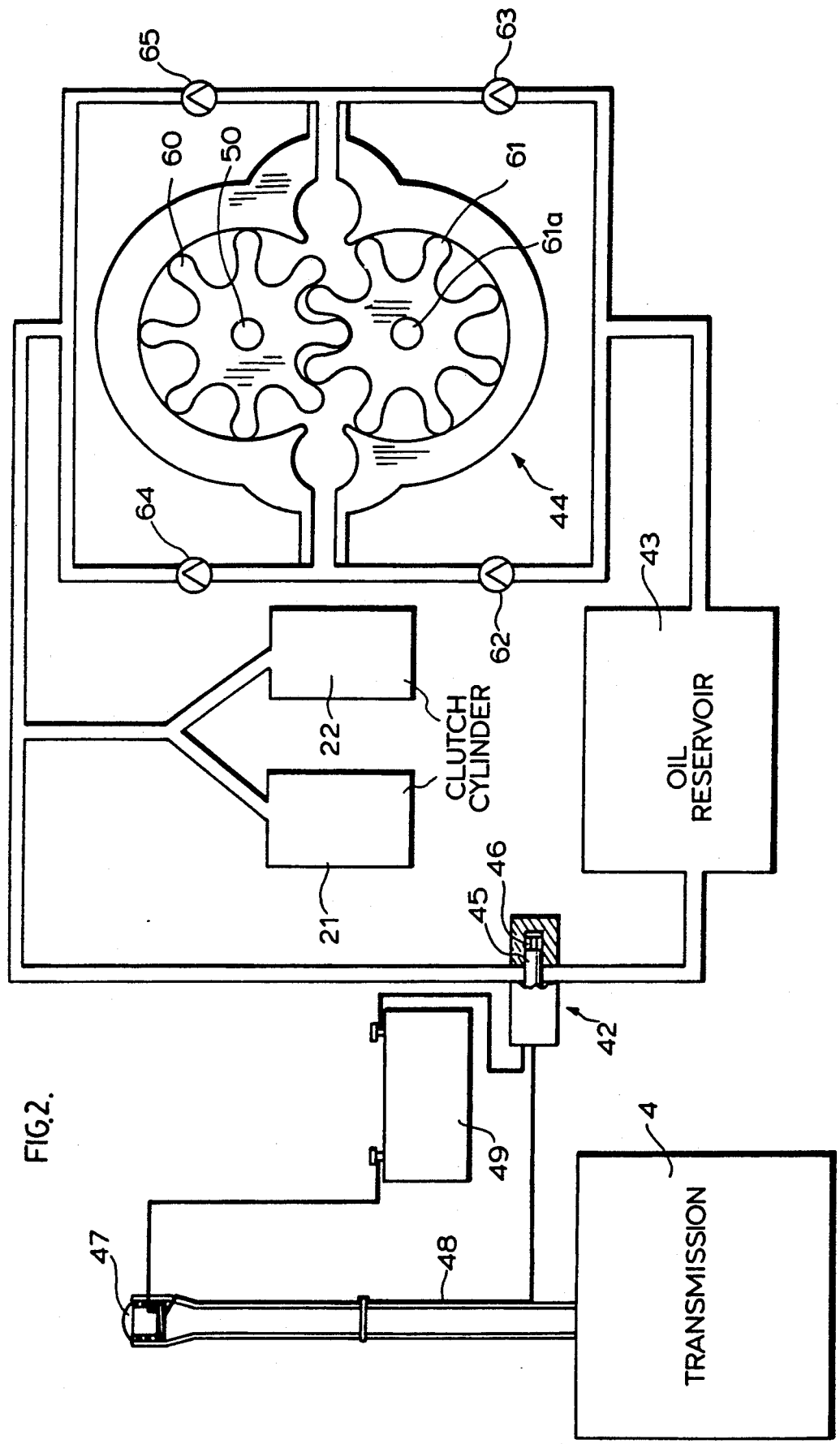
FIG. 2 is a simplified, schematic diagram of a hydraulic circuit for use with the first invention shown in FIG. 1.

FIG. 2 shows a schematic flow diagram for a hydraulic circuit for use with the clutch assembly shown in FIG. 1. The simplified circuit is shown to have clutch cylinders 21 and 22, solenoid oil valve 42, oil reservoir 43 and oil pump 44 connected by oil lines.

Oil pump 44 pumps oil only in one direction from the reservoir 43 toward oil valve 42 and then to reservoir 43. Oil valve 42 is an electrically controlled solenoid valve which can assume either a closed position or an open position. Valve 42 is shown in a closed position in which case valve piston 45 prevents oil from passing through valve 42. On activation, valve piston 45 is moved to the left as seen in FIG. 2 so that its reduced cross-sectional portion 46 permits oil flow therethrough. As shown schematically in FIG. 2, oil valve 42 is activated by depressing a knob 47 on the top of a gear shift lever 48. Depression of knob 47 is, in a known manner, a precondition of shifting gears in transmission 4. Depressing knob 47 closes an electrical circuit schematically shown to include a DC battery 49 connected by wiring with solenoid valve 42 and across the gear shift switch comprising the knob 47 and lever 48.

In operation, with oil valve 42 closed, turning of the oil pump 44 will pump oil into chambers 40 of clutch cylinders 21 and 22 to overcome the bias of springs 41 and move pistons 34. Movement of pistons 34 moves clutch disc 20 toward clutch disc 19 and sandwiches the clutch plate 24 in frictional engagement therebetween to engage the clutch. With the clutch engaged, on opening oil valve 42, oil is discharged from chambers 40 through the open oil valve 42 and passes back to reservoir 43 under the force of springs 41. Thus, clutch disc 20 is moved away from clutch disc 19 and the clutch plate 24 is disengaged.

Referring again to FIG. 1, oil pump 44 is also fixed to flywheel 18 by being carried on bracket 32. Pump 44 has a mechanical input shaft 50 carrying at its end a bevel gear 51. Shaft 50 and pump bevel gear 51 are journalled by bearings 52 in a bracket collar 53 fixed to bracket 32.

Pump bevel gear 51 meshes with clutch plate bevel gear 54 which is fixed to clutch plate 24 and rotates therewith. Clutch plate 24 carries a dome-like annular extension 55 which, in turn, carries a centrally toothed ring 56. The central teeth of ring 56 engage a splined end portion 57 of shaft 58 of clutch plate bevel gear 54. Bevel gear 54 is journalled by its shaft 58 being received in a bearing 59 held within a circular central opening in annular bracket 32. The spline coupling between plate 56 and shaft 58 permits axial sliding of clutch plate 24 while maintaining rotational engagement of ring 56 and shaft 58.

Pump 44 is a positive displacement type of pump which is shown schematically in cross-section in FIG. 2 as having intermeshing positive displacement impellers 60 and 61 with impeller 60 being coupled to pump input shaft 50 and the other impeller 61 rotatable about a parallel central axle 61a. By a series of one-way valves indicated 62, 63, 64 and 65, in which each permit flow only the direction of their respective arrow, these valves ensure that oil is pumped only in a direction from reservoir 43 toward the oil valve whether impeller 60 is rotated clockwise or counter-clockwise. The one-way valves also prevent oil flow in the reverse direction when the impellers of the pump 44 are not rotating.

The arrangement of FIG. 1 is such that pump inlet shaft 50 rotates at a speed which is equal to the difference in relative angular velocities between the drive shaft 10 and the driven shaft 12.

If, for example, the clutch is fully engaged, then clutch discs 19 and 20 frictionally engage clutch plate 24 and they rotate at the same speed. In this case, there is no relative rotation of the clutch plate bevel gear 54 relative to the annular bracket 53 and, hence, no rotation of bevel gear 51 or input shaft 50. All parts as seen in FIG. 1 would rotate together in unison and the impellers 60 and 61 are stationary inside the pump.

If the clutch is disengaged, then clutch plate bevel gear 54 rotates at the speed and direction of clutch plate 24 while the bevel gear 51 and its radially extending input shaft 50 rotate about the clutch plate bevel gear 54 in the speed and direction of driven shaft 12. Providing pump 44 to pump oil in one direction only provides proper oil flow irrespective of the relative direction of the drive shaft 10 and driven shaft 12. Providing the impellers of pump 44 to pump oil at rates proportional to the difference in angular velocities of the drive shaft 10 and driven shaft 12 is advantageous to provide positive smooth coupling of the clutch system and to ensure that the clutch discs 19 and 20 are urged together to engage the clutch plate 24 with adequate force. Any slippage of the clutch plate 24 relative to the clutch discs will result in oil pump 44 pumping additional oil into the clutch cylinders 20 and 21 which will increase the force with which the clutch plate 24 is sandwiched between the clutch discs 19 and 20.

The hydraulic circuit optionally may be configured to transmit rotational forces between the drive shaft and the driven shafts when the clutch is not engaged. For example, with oil valve 42 open, oil pumped by pump 44 passes through the circuit to oil reservoir 43. The hydraulic circuit may be provided with an inherent or variable resistance to oil flow on rotation of impellers 60 and 61. By optionally selecting this resistance to be sufficiently high, the resistance will cause the impellers to rotate at a speed less than that corresponding to the difference in speed between the drive shaft 10 and the driven shaft 12. This resistance will increase as the difference in speed between the two drive shafts increases. In a case, for example, where the drive shaft 10 is rotating at a high speed with the oil valve open and the driven shaft 12 is not rotating, the hydraulic resistance can serve to pre-rotate the driven shaft. Such a situation can arise when a transmission may be in neutral, the vehicle is stopped and the engine motor is rotated and, of course, the oil valve is open. In this situation, the hydraulic circuit hydraulically links the drive shaft 10 to the driven shaft 12 and, via the hydraulic circuit, rotational energy from the drive shaft 10 will be, in part, transmitted to the driven shaft 12. When a sufficiently high resistance is provided, the hydraulic circuit, with the oil valve open, hydraulically links the drive shaft and driven shaft so as to force them towards rotating at the same speed. Such a hydraulic link may be advantageous in providing smooth clutch engagement of a vehicle, particularly in start-up conditions with the vehicle at rest. By selecting the oil circuit to have a low resistance, this hydraulic coupling of the drive shaft and driven shaft is effectively eliminated.

The first embodiment of the invention may be used in an automobile either with a manual or an automatic transmission. With a manual transmission, the conventional clutch pedal may be eliminated. The clutch is disengaged on depressing knob 47 before shifting the gear shift lever 48 and the clutch is re-engaged by releasing knob 47 once the gear shift lever 48 has been shifted to the desired gear. With an automatic transmission, the shifting switch shown in FIG. 2 and characterized by the depressable knob 47 is replaced by an automatic switch which senses when the automatic transmission is to shift gears. The switching device then generates an electrical signal to disengage the clutch for the duration desired by activation of the oil valve.

Figure 3:
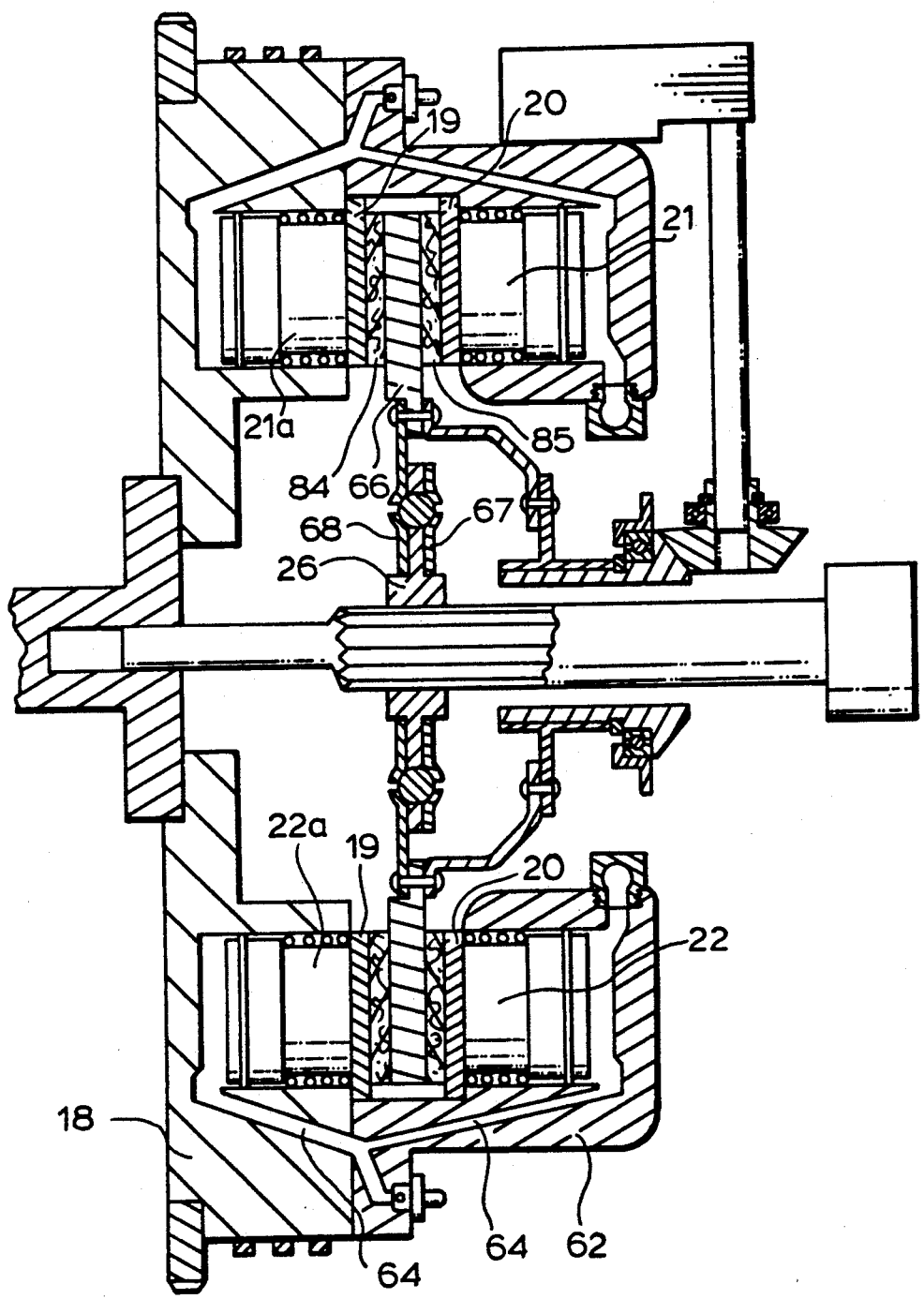
FIG. 3 is a schematic cross-sectional view similar to FIG. 1 of a second embodiment of a friction clutch system in accordance with this present invention.

Reference is now made to FIG. 3 which shows a cross-sectional view through a second embodiment of a clutch assembly in accordance with this invention. The system of FIG. 3 is substantially the same as the system of FIG. 1 with the exception that clutch disc 19 is axially movable by a second set of clutch cylinders 21a and 22a are provided in opposed relation to clutch cylinders 21 and 22. This configuration provides for double the forces to be applied in sandwiching the two clutch discs 19 and 20 onto the clutch plate 24. FIG. 3 also shows the advantageous modification of the flywheel so as to provide the clutch cylinders 21a and 22a within cylindrical bore in the flywheel. FIG. 3 also shows strengthened mounting brackets 62 secured to the flywheel and serving to support and define therein the clutch cylinders 21 or 22. Passageways 64 are shown bored in the flywheel 18 and bracket 62 to provide oil lines.

FIG. 1 and 3 show one form of piston 34 for the clutch cylinders Such springs or their equivalent may otherwise be provided in accumulators separate from the clutch cylinders.

In FIGS. 1 and 3, the clutch plate 24 has an annular ring 66 to be frictionally engaged between the clutch discs 19 and 20. The clutch plate 24 further comprises an assembly of inner ring 26, first annular plate 67 and second annular plate 68. The second annular plate 68 is coupled by rivets to both ring 66 and annular extension 55, in turn, coupled to toroidal plate 56. The assembly of inner ring 26 and the annular plates 67 and 68 are in a known manner joined with rivets which couple the plates 67 and 68 together for minor relative pivoting dampened by dampening springs generally indicated 69.

Figure 4:
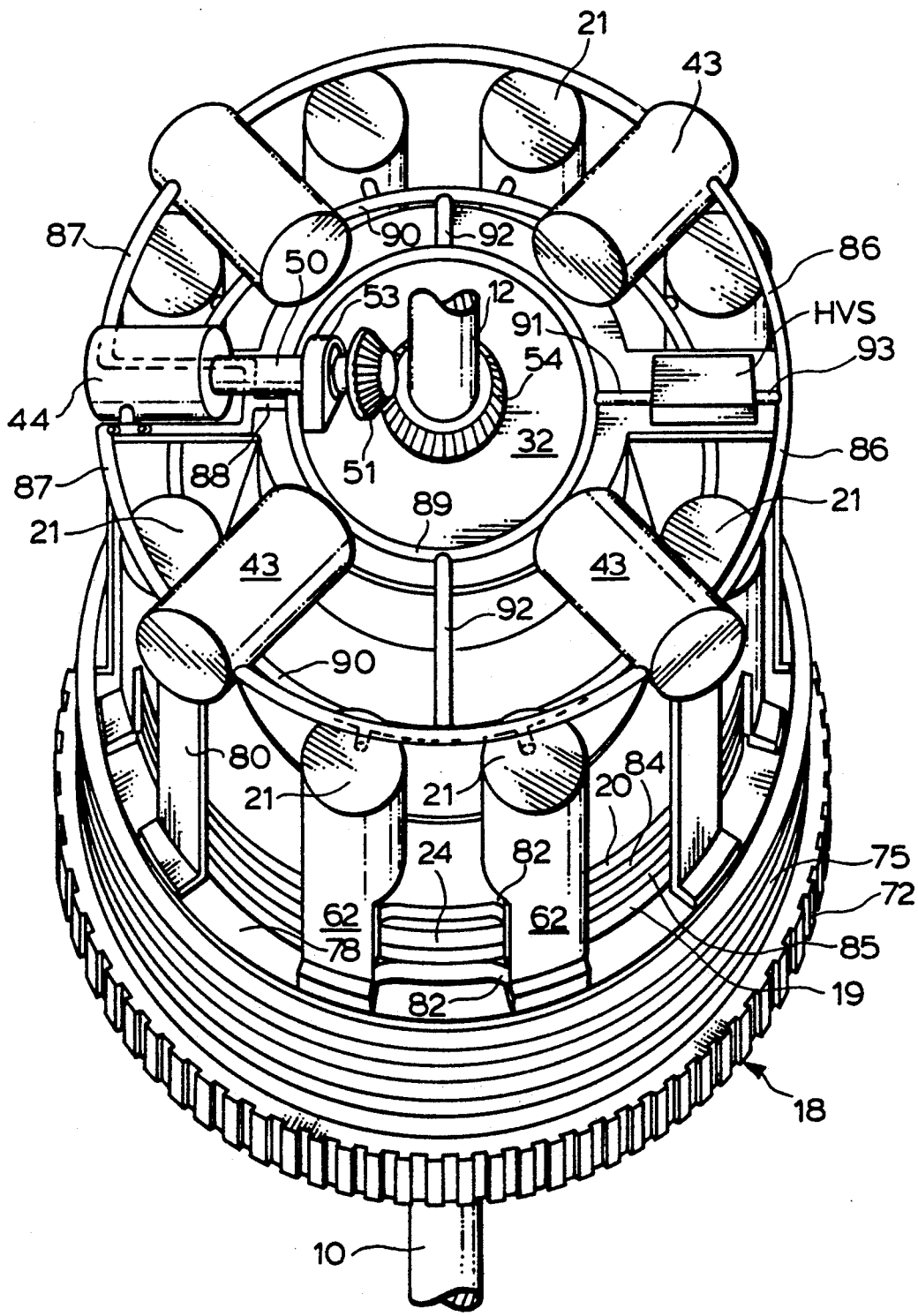
FIG. 4 is a pictorial representation of a clutch system in accordance with a third embodiment of this invention.

In the embodiments of FIGS. 1 and 3, the clutch discs 19 and 20 may assume a number of configurations. As seen in FIG. 4, the clutch discs preferably comprise a continuous ring. This is not necessary, however, and the clutch discs could comprise a number of discrete pad-like disc members provided only in the area of the clutch cylinders.

Reference is now made to FIG. 4 showing a pictorial representation of a preferred clutch assembly in accordance with a third embodiment of the invention. In FIG. 4 and throughout all the drawings, similar elements are referred to by the same reference number. FIG. 4 shows an embodiment which is, to some extent, a hybrid containing features of both the first and second embodiments of the clutch assembly.

FIG. 4 shows flywheel 18 having two axial shoulders, a first shoulder 72 carrying teeth to form a ring gear and a second shoulder 74 shown with three axially spaced raised circumferential lands 75 which serve as electrical contact points for electrical connection of circuitry carried on the rotating flywheel and circuitry on the remainder of the automobile. The flywheel has a relatively flat circular end surface 78 upon which many of the elements of the assembly are mounted.

FIG. 4 shows eight clutch cylinders 21 mounted to the flywheel by mounting brackets 62. Bracket 32 extends diametrically across the flywheel 18 at a height above the clutch cylinders 21 and carries thereon oil pump 44 and bracket collar 53 which supports the remote end of pump input shaft 50 and its bevel gear 51.

Four oil reservoirs 43 are shown secured to the flywheel at their radial outer ends by brackets 80 and secured at their radially inner end to bracket 32.

Clutch discs 19 and 20 are shown as annular rings which at their circumferentially outer edge have keyways generally indicated 82 cut therein which engage about the mounting brackets 62 of the clutch cylinders as keys so as to prevent the clutch discs 19 and 20 from rotation relative to flywheel 18. Each clutch disc 19 and 20 carries a lining pad 84 and 85 in the form of a ring secured to the respective clutch disc. Clutch plate 24 is shown and sandwiched between the two clutch discs 19 and 20.

A hydraulic valving system, HVS, comprising the solenoid oil valve 42 and other components for control and discharge of hydraulic pressure built up in the clutch cylinders are carried on an arm of bracket 32 opposite oil pump 44. As to the hydraulic arrangement, oil reservoirs 43 are interconnected by oil lines 86 which provide inlets to the pump as at 87. Oil is pumped from the pump via line 88 to a circular ring 89 from which it is distributed annularly via two radial lines 92 and outer ring of lines 90 connected to the individual clutch cylinders 21. Pressure may be released from the cylinders by passing from inner ring 89 via line 91 through the hydraulic valving system to line 93 connecting with the outer feeder line 86 to the oil reservoirs. By the relative location of the oil reservoirs, clutch cylinder and oil pump and valving system at symmetrical or diametrically opposed locations, the flywheel will remain balanced.

Figure 5:
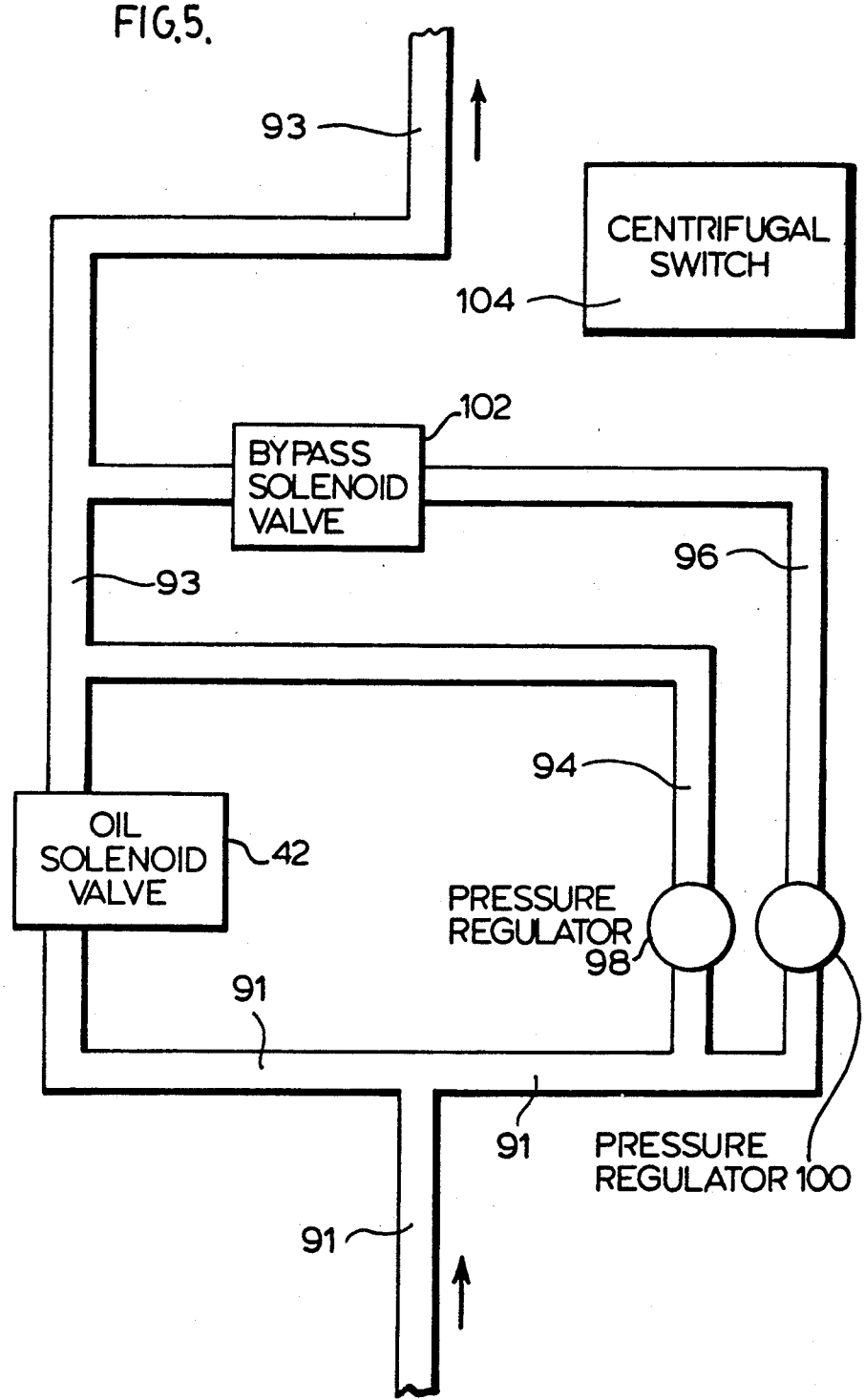
FIG. 5 is an enlarged schematic view of the hydraulic control valving system of FIG. 4.

Reference is now made to FIG. 5 which shows an enlarged view of the hydraulic valving system carried on the arm of bracket 32 opposite oil pump 44. In this system, line 91 is connected by solenoid valve 42 to discharge line 93. Two bypass lines 94 and 96 are shown.

Bypass line 94 incorporates a first pressure regulator 98. This first pressure regulator is a pressure controlled one-way relief valve which discharges oil through line 94 only when the pressure in line 91 exceeds a maximum pressure, Pl.

Bypass line 96 includes a second pressure regulator 100 and a second solenoid bypass valve 102. The second pressure regulator 100 is also a pressure relief valve and permits oil to pass to line 96 only when the oil pressure in line 91 exceeds a maximum pressure, P2. Preferably, the pressure regulators are chosen so that P1 is greater than P2. Bypass line 96 also has a second solenoid bypass valve 102.

The hydraulic valving system illustrated may be controlled by a control system in a number of ways. Under conditions where the clutch is to be disengaged, solenoid valve 42 is to be open. Under conditions when the clutch is to be engaged, solenoid valve 42 is to be closed. When closed, the maximum pressure possible in the clutch cylinders will depend on whether bypass valve 102 is open or closed. If bypass valve 102 is open, the maximum pressure will be P2. If bypass valve 102 is closed, the maximum pressure will be Pl. The control system will control the opening and closing of the valves 42 and 102 under varying conditions. The control system can comprise simple electrical off/on or limit switches such as the gear shift switch with its knob 47 or a more complex microprocessor system.

There are many ways to control the hydraulic valving system. Following is a simple example in which two sensors are preferably provided to assist in control of the hydraulic system. A first sensor is a sensor which senses the movement of the vehicle as, for example, a speedometer (not shown). The second sensor is a sensor which senses engine speed in the manner of a tachometer. A simplified sensor for engine speed can be a centrifugal sensor 104 carried on bracket 32 which senses centrifugal forces on the flywheel as when engine speed is above a minimum.

The inputs from the speedometer sensor and the tachometer sensor control the solenoid valve 42 so that when the engine RPM is low and the speedometer reading is nil or below a preset minimum, then valve 42 is always open, for example, overriding control of the valve 42 by the gear shift switch carried on gear shift knob 47. This prevents engagement of the clutch at a time when the engine speed is low and the car is stopped as in such conditions it is expected that engagement of the clutch would result in the engine stalling. This condition occurs principally on start-up of a car from rest in first gear.

When the speedometer reading is zero or below a preset minimum and the tachometer reading is above a preset minimum, then solenoid bypass valve 102 is open. With solenoid bypass valve 102 open, pressure in the hydraulic system may increase to the maximum set by P2 in that pressure regulator 100 can permit discharge via line 96 through valve 102. Pressure P2 is advantageous for clutch engagement in start-up conditions with a car at rest.

Once the vehicle is moving and the speedometer reading is above a preset minimum, then irrespective of the tachometer reading, solenoid bypass valve 102 is kept closed. With solenoid bypass valve 102 closed, the maximum pressure which can arise in the hydraulic system is Pl in that pressure regulator 100 cannot permit discharge via line 96 due to closed solenoid bypass valve 102. When the car is moving under operating conditions, the maximum pressure required for clutch engagement is selected to be Pl which is greater than the maximum pressure P2 advantageous for initial start-up. Solenoid valve 102 may advantageously be replaced by a valve which, when the speedometer reading is above a preset minimum, will change, preferably increase, its restriction to flow as the tachometer reading increases.

The particular electrical wiring connections for connection and control of solenoid oil valve 42 and second solenoid bypass valve 102 and the associated speed sensor have not been shown.

In use of a friction clutch, the lining pads 84 and 85 will be subject to wear and means need to be provided to adjust the relative location of the movable clutch discs 20 with wear of the lining pads. Such adjustments may be provided by known methods and adjustment systems may be provided associated with each individual clutch cylinder or alternatively separate clutch space or adjustors could be provided as, for example, mounted between the clutch cylinder.

To accommodate the hydraulic control system shown in FIG. 5 for use with an automatic transmission, it may be advantageous to provide additional bypass lines similar, for example, to line 96, possibly, with additional solenoid valves for activation to, for example, disengage the clutch. When used with an automatic transmission, the control system would be activated on the transmission switching from one gear to another.

Figure 6:
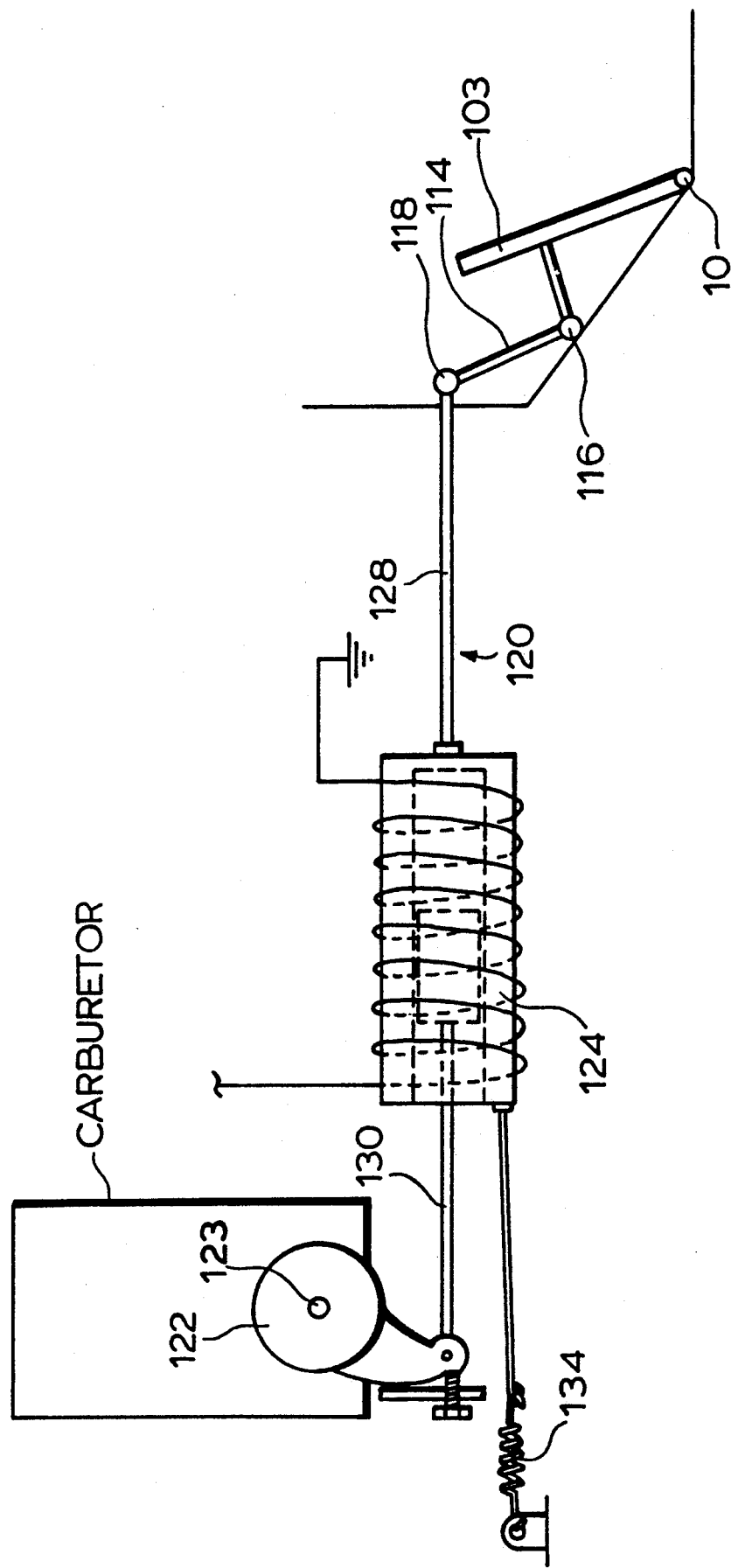
FIG. 6 is a schematic view of a system to automatically reduce engine speed when shifting gears.

Reference is now made to FIG. 6 which shows a schematic view of a system to automatically reduce the engine speed when shifting gears. As seen in FIG. 6, an accelerator pedal 103 is provided for pivoting about point 104. The pedal engages a link member 114 pivotable about 116 and coupled at its end 118 to an accelerator rod generally indicated 120. The accelerator rod 120 is coupled at its remote end to a carburetor throttle linkage 122 pivotable about 123. In a conventional manner, depression of the accelerator pedal will move the carburetor throttle linkage and increase the speed of the engine. The novel accelerator pedal rod in accordance with this invention incorporates within the rod 120 a speed adjustment solenoid 124. When activated, the solenoid increases the length of the accelerator pedal rod as by sliding one portion 128 of the rod with respect to telescoping portion 130 of the rod. A return spring 134 is shown to return the carburetor throttle linkage to a lower engine speed setting on release of pressure from the accelerator pedal.

In use, on activation of the speed adjustment solenoid, the throttle setting engine speed will be decreased corresponding to the stroke of the speed adjustment solenoid.

The speed adjustment solenoid preferably is to be used in association with the novel hydraulic clutch assembly of the present invention. Both solenoid 42 of the clutch assembly and the speed adjustment solenoid 124 may be simultaneously activated by the electrical switch incorporated in knob 47 on the gear shift lever 48. Thus, on depressing the gear shift knob 47 before moving gear shift lever, both the clutch is automatically disengaged and the engine speed is reduced. After the gear shift lever 48 is moved to a new gear position and the knob 47 released, the clutch will then automatically be re-engaged and the engine speed will automatically be increased.

The preferred embodiment describes use of the new friction clutch of this invention in a vehicle. The clutch may, however, be used in substitution of known clutches in many other applications.

While the invention has been described with reference to preferred embodiments, the invention is not so limited. Many modifications and variations will now occur to those skilled in the art. For a definition of the invention, reference is now made to the following claims.

What I claim is:

1. In a vehicle with an engine having output drive shaft means and transmission means with input driven shaft means; a plurality of gear settings, and gearshift lever means movable to select the gear settings;

a friction clutch system to releasably couple the drive shaft means to the driven means comprising:

first clutch means rotatable about an axis, the first clutch means coupled to the drive shaft means for rotation therewith, second clutch means journalled for rotation about said axis adjacent the first clutch means, the second clutch means coupled to the driven shaft means for rotation therewith, one of the first clutch means and second clutch means axially displaceable into frictional engagement with the other to rotate the driven shaft means and the drive shaft means together, spring means biasing the first clutch means and second clutch means out of frictional engagement, hydraulic circuit means comprising pump means; clutch cylinder means; and oil valve means, connected by oil line means with the pump means to circulate oil from the pump means to the clutch cylinder means, and then back to the pump means, the oil valve means movable between an open position to permit oil flow therethrough and a closed position to prevent oil flow therethrough, the oil valve mean biased to assume the closed position, the clutch cylinder means operable when pressurized by oil from said pump means when said oil valve means is closed to overcome the bias of the spring means and urge said first clutch means and said second clutch means together into frictional engagement, one way means preventing reverse flow of oil through said pump means from said clutch cylinder means, the pump means mechanically coupled between the drive shaft means and the driven shaft means to pump oil to the clutch cylinder means at flow rates which increase with an increase in the difference in rotational speeds of the drive shaft means and the driven shaft means;

the hydraulic circuit means maintaining pressure in the clutch cylinder means when the oil valve means is closed, gearshift switch means activated during movement of the gearshift lever means, the gearshift switch means while activated maintaining the oil valve means in the open position, when the oil valve means is open, oil pumped by the pump means circulates through the hydraulic circuit means and resistance in the hydraulic circuit means to circulation of oil pumped therethrough causes transfer through the pump means of rotational forces between the drive shaft means and driven shaft means urging them to change their speed of rotation to approach that of the other.

2. A system as claimed in claim 1 further comprising:

flywheel means coupled to the drive shaft means for rotation therewith, said first clutch means, said hydraulic circuit means and said spring means all coupled to the flywheel means for rotation therewith, said first clutch means and said second clutch means comprising annular plate means.

3. A system as claimed in claim 1 wherein said oil valve means comprises an electrically operated solenoid valve spring biased to one of said open and closed positions, said gearshift switch means on activation maintaining an electric circuit in either an open or closed configuration to maintain said solenoid valve in the other of said open and closed positions.

4. A system as claimed in claim 1 wherein said transmission means comprises a manual transmission, said gear shift switch means being activated on movement of a manual gearshift for the manual transmission.

5. A system as claimed in claim 1 wherein said transmission means comprises an automatic transmission, said gear shift switch means being activated on said automatic transmission shifting from one gear to another.

6. A system as claimed in claim 1 wherein, with the oil valve open, the first clutch means and second clutch mean disengaged, and the drive shaft means rotating at a different speed than the speed of the driven shaft means, on the oil valve control means closing the oil valve means, the pump means pumps oil to increase the oil pressure in the clutch cylinder means to a pressure sufficient to urge said first clutch means and said second clutch means into frictional engagement and rotate the driven shaft means at the speed of the drive shaft means, whereupon pressure retained in the clutch cylinder means between the pump means and the closed oil valve means retains the first clutch means and second clutch means in frictional engagement, and wherein, on opening the oil valve means, pressure in the clutch cylinder means reduces to a level insufficient to overcome the bias of the spring means and the spring means forces the first clutch means and second clutch means apart out of frictional engagement.

7. A vehicle as claimed in claim 1 in which the engine may operate at varying throttle settings, and the vehicle includes throttle reduction means movable between a first position in which the throttle setting is not altered and a second position in which the throttle setting is reduced, the gearshift switch means when activated also maintaining the throttle reduction means in the second position.

8. A friction clutch system as claimed in claim 1 wherein the hydraulic circuit means including pressure relief means to vent oil from the clutch cylinder means when pressure therein is greater than a maximum pressure.

9. In a vehicle with an engine having output drive shaft means and transmission means with input driven shaft means; a plurality of gear settings, and gearshift lever means movable to select the gear settings;

a friction clutch system to releasably couple the drive shaft means to the driven shaft means comprising:

first clutch means rotatable about an axis, the first clutch means coupled to the drive shaft means for rotation therewith, second clutch means journalled for rotation about said axis adjacent the first clutch means, the second clutch means coupled to the driven shaft means for rotation therewith, one of the first clutch means and second clutch means axially displaceable into frictional engagement with the other to rotate the driven shaft means and the drive shaft means together, hydraulic circuit means comprising pump means; clutch cylinder means; and oil valve means, connected by oil line means with the pump means to circulate oil from the pump means to the clutch cylinder means, and then back to the pump means, the oil valve means movable between an open position to permit oil flow therethrough and a closed position to prevent oil flow therethrough, the oil valve means biased to assume the closed position, the clutch cylinder means operable when pressurized by oil from said pump means when said oil valve means is closed to urge said first clutch means and said second clutch means together into frictional engagement, one way means preventing reverse flow of oil through said pump means from said clutch cylinder means, the pump means mechanically coupled between the drive shaft means and the driven shaft means to pump oil to the clutch cylinder means at flow rates which increase with an increase in the difference in rotational speeds of the driven shaft means and the driven shaft means;

the hydraulic circuit means maintaining pressure in the clutch cylinder means when the oil valve means is closed, gearshift switch means activated during movement of the gearshift lever, the gearshift switch means while activated maintaining the oil valve means in the open position, when the oil valve means is open, oil pumped by the pump means circulates through the hydraulic circuit means and resistance in the hydraulic circuit means to circulation of oil pumped therethrough causes transfer through the pump means of rotational forces between the drive shaft means and driven shaft means urging them to change their speed of rotation to approach that of the other.

10. A vehicle as claimed in claim 9 in which the engine may operate at varying throttle settings, and the vehicle includes throttle reduction means movable between a first position in which the throttle setting is not altered and a second position in which the throttle setting is reduced, the gearshift switch means when activated also maintaining the throttle reduction means in the second position.

11. A friction clutch system as claimed in claim 9 wherein the hydraulic circuit means including pressure relief means to vent oil from the clutch cylinder means when pressure therein is greater than a maximum pressure.

12. A system as claimed in claim 9 further comprising:

flywheel means coupled to the drive shaft means for rotation therewith, said first clutch means and said hydraulic circuit means being coupled to the flywheel means for rotation therewith.

* * * * *